United States Patent [19]
McGinn

[11] Patent Number: 5,333,192
[45] Date of Patent: Jul. 26, 1994

[54] LINE INTERFACE CIRCUIT

[75] Inventor: Donald S. McGinn, Almonte, Canada

[73] Assignee: Northern Telecom Limited, Montreal, Canada

[21] Appl. No.: 711,600

[22] Filed: Jun. 7, 1991

Related U.S. Application Data

[63] Continuation-in-part of Ser. No. 553,473, Jun. 26, 1990, abandoned.

[51] Int. Cl.$^5$ ............................................. H04M 19/00
[52] U.S. Cl. ..................................... 379/399; 379/402; 379/403; 379/404
[58] Field of Search ............... 379/387, 398, 399, 400, 379/401, 402, 403, 404, 413, 405

[56] References Cited

U.S. PATENT DOCUMENTS

| | | | |
|---|---|---|---|
| 3,042,816 | 7/1962 | Aagaard | 379/399 |
| 4,368,362 | 1/1983 | Chung et al. | 379/404 |
| 4,368,362 | 1/1983 | Chung et al. | 379/404 |
| 4,498,018 | 2/1985 | Löfmark | 379/402 |
| 4,807,283 | 2/1989 | Pyhälammi | 379/404 |
| 4,829,567 | 5/1989 | Moisin | 379/413 |
| 4,872,199 | 10/1989 | Kawami et al. | 379/405 |
| 4,914,693 | 4/1990 | Beck et al. | 379/405 |
| 4,922,531 | 5/1990 | Moisin | 379/402 |
| 5,014,305 | 5/1991 | Moisin | 379/402 |
| 5,052,039 | 9/1991 | Moisin | 379/402 |

OTHER PUBLICATIONS

Radio Shack's Linear Applications vol. I p. AN31-10; Nov. 1967.

Primary Examiner—James L. Dwyer
Assistant Examiner—M. Shehata
Attorney, Agent, or Firm—Moorhouse J. E.

[57] ABSTRACT

A line interface circuit for coupling signals between a telephone line and a hybrid circuit includes a loop driver circuit for supplying energizing current to the telephone line and for driving the telephone line with alternating current signals. A loop current detector connected in series between the telephone line and the loop driver circuit, generates a voltage signal in response to current flow in the telephone line. Amplifier circuits are arranged to be responsive to differential signals on the telephone line, and to signals from the hybrid circuit, for generating a composite signal. The composite signal and the voltage signal are combined in a network having an output connected to control the operation of the loop driver circuit so that the telephone line is terminated with a preferred impedance.

9 Claims, 4 Drawing Sheets

LINE INTERFACE CIRCUIT

This application is a continuation-in-part of application Ser. No. 533,473 filed 26 Jun. 1990 now abandoned.

INTRODUCTION

The invention is in the field of telephony and more particularly relates to interface circuits for supplying energizing current from a power source for operation of a telephone set, via a telephone line, and for coupling signals between the telephone line and a telephone facility.

BACKGROUND OF THE INVENTION

One of the major expenses in a telephone system is that of providing a line interface circuit for connecting each and every telephone line at a central office switching facility, or at a private branch exchange facility. In any practical telephone system, the line interface circuits are desirably inexpensive and essentially electrically robust. During those times when a telephone set is in use, the associated telephone line interface circuit provides an energizing direct current for the telephone set, via tip and ring leads of the telephone line. When the telephone set is in use, it is usually referred to as being OFF HOOK, and when the telephone set is not in use, it is referred to as being ON HOOK. The line interface circuit is also required to provide indication as to the telephone set being ON HOOK or OFF HOOK.

A source of the energizing current is usually a central battery supply. The central battery supply is continually charged to a predetermined voltage by a battery charging apparatus, provided for that purpose. The battery charging apparatus is operated from utility power, but in the event of an interruption of the utility power the central battery supply is intended to continue to supply operating current for a limited time. The battery charging apparatus often includes a switching invertor, which as a by-product of its operation, generates electrical noise. Typically one of the functions of the line circuit is that of preventing noise signals of any origin from traversing the connection between the central battery supply and the telephone line. For example, in the U.S. Pat. No. 4,103,112 issued on Jul. 25, 1978 to V. V. Korsky, and titled "Telephone Line Circuit With Differential Loop Current Sensing And Compensation", a telephone line is terminated at tip and ring terminals connected to tip and ring windings of a transformer. Energizing direct current is conducted by 200 ohm tip and ring feed resistors connected in series between the battery supply and the tip and ring windings. A 2.16 microfarad capacitor is connected between the tip and ring windings. The capacitor provides an impedance path for alternating current voice band signals, whereby very little of the signal energy is dissipated across the feed resistors.

The value of the capacitor is essential in determining the terminating impedance of the line circuit. In U.S. Pat. No. 4,864,609, issued on Sep. 5, 1989 to M. S. Moisin, and titled "Telephone Line Interface Circuit", a compensating circuit for adjusting the value of the operating terminating impedance to more closely approach the value of a predetermined preferred terminating impedance, is discussed. The compensating circuit is connected to drive a winding, in the transformer, in a current opposing relationship with respect to some of the differential alternating current signals in the tip and ring windings. The differential alternating current signals specifically referred to are those within a lower portion of the voice frequency range, for which an impedance of the capacitor is significantly shunted by the feed resistors.

U.S. Pat. Nos. 4,764,956, issued 16 Aug. 1988 to R. Rosch et al; 4,514,595, issued 30 Apr. 1985 to S. Rosenbaum et al; 4,484,032, issued 20 Nov. 1984 to S. Rosenbaum; 4,539,438 issued 3 Sep. 1985 to S. Rosenbaum et al; 4,532,381, issued 30 Jul. 1985 to S. Rosenbaum et al and 4,571,460 issued 18 Feb. 1986 to S. Rosenbaum et al are each concerned with providing the required terminating impedance via active circuit apparatus. Particularly, tip and ring amplifiers are controlled in response to direct loop current and alternating differential current signals detected across tip and ring feed resistors, to generate the terminating impedance and to inject alternating current signals for transmission via the telephone line to the telephone set. The detected line current is also used as a source of alternating current signals for transmission to a hybrid circuit wherein signals from the telephone set are transmitted via the associated telephone facility.

The performance of these types of line interface circuits is adversely affected by practical limitations of common mode rejection characteristics of analog differential amplifier circuits. These characteristics may be significantly compromised in the interest of economy, by integration of the analog differential amplifiers along with digital circuit elements, essential for pulse code modulated time division multiplex interface with the associated telephone facility. These characteristics may be further compromised if either of the tip and ring feed resistors becomes mismatched. For example, during use of a line interface circuit, one of the tip and ring feed resistors may age in response to unusual stress, as may accompany a transient electrical event such as a power line cross or a lightning strike in association with the telephone line.

SUMMARY OF THE INVENTION

The invention is a line interface circuit for supplying energizing current from power terminals to a two wire communication line and for coupling communications signals between the communication line and a telephone facility via a hybrid circuit means. The line interface circuit includes tip and ring terminals for connection to the two wire communication line and hybrid transmit and receive terminals for connection to the hybrid circuit means. A tip and ring signal voltage detector, is responsive to differential signals appearing across the tip and ring terminals and to signals appearing at the receive terminal, for generating a composite signal. A loop driver circuit is connected in series between the power terminals for supplying the energizing current, and is responsive to a control signal for driving alternating current signals via the tip and ring terminals. A loop current detector is connected in series between the tip and ring terminals and the loop driver circuit, for generating a line signal in response to current flow in the communication line. A network includes a first port being connected to receive the composite signal from the tip and ring signal voltage detector, a second port being connected to receive the line signal from the loop current detector, and a third port being connected to the loop driver circuit for providing the control signal.

In one example of the line interface circuit, the loop driver circuit includes a voltage amplifier and a transformer. The transformer includes a tip winding being connected in series between the tip terminal and one of the power terminals and a ring winding being connected in series between the ring terminal and another of the power terminals with the tip and ring windings being poled such that energizing current flow is of a flux aiding effect. The voltage amplifier includes an input connected to receive the control signal from the network, and an output connected to a primary winding of the transformer for driving the alternating current signals.

In another example, a line interface circuit is provided for supplying energizing current from power terminals to a two wire communication line and for coupling communication signals between the communication line and a telephone facility via a hybrid circuit. The line interface circuit includes tip and ring terminals for connection to the two wire communication line and hybrid transmit and receive terminals for connection to the hybrid circuit. A first amplifier includes an output and differential inputs. One of the differential inputs is RC coupled to the tip terminal and another of the differential inputs is RC coupled to the ring terminal. A feedback resistor is connected between the output and an inverting one of the differential inputs.

A network includes first and second ports, and a third port for providing a control signal. A second amplifier includes an output connected to the first port of the network, and an input being resistively coupled to the output of the first amplifier and resistively coupled to the hybrid receive terminal. A loop driver circuit is connected in series between the power terminals for supplying the energizing current, and the loop driver circuit is also responsive to the control signal for driving alternating current signals via the tip and ring terminals. A loop current detector is connected in series between the tip and ring terminals and the loop driver circuit, and includes an output connected to the second port of the network. In operation, the loop current detector generates a supervision signal for use by the network along with signals from the second amplifier to provide the control signal.

BRIEF DESCRIPTION OF THE DRAWINGS

Example embodiments are discussed with reference to the accompanying drawings in which.

DESCRIPTION OF THE PREFERRED EMBODIMENT

Figure 1:
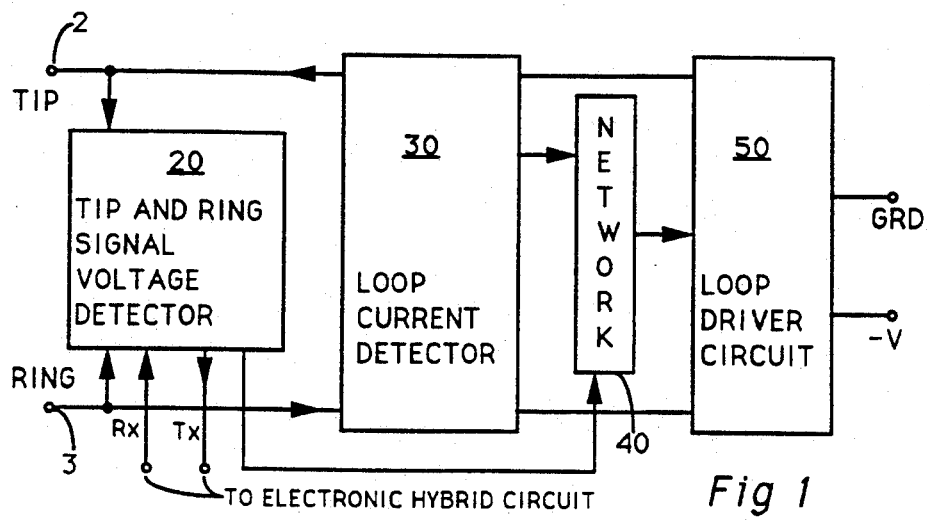
FIG. 1 is a block diagram of a line interface circuit in accordance with the invention.

The line interface circuit illustrated in FIG. 1 includes tip and ring terminals 2 and 3 for connection to the tip and ring leads of a telephone line (not shown), power −V and ground GRD terminals for connection to a battery supply (not shown) and transmit and receive leads Tx and Rx for connection to an electronic hybrid circuit (not shown). Some of the signals appearing at the transmit lead Tx are destined for an associated telephone facility (not shown), and are selected by the electronic hybrid circuit for transmission into the telephone facility. Signals appearing at the receive lead Rx from the hybrid circuit, are destined for transmission via the tip and ring terminals 2 and 3, to the telephone line.

In the line interface circuit, a tip and ring signal voltage detector 20 is responsive to differential signals appearing across the tip and ring terminals 2 and 3 for generating a corresponding single ended signal. The single ended signal and the receive signal are used to provide a composite signal which is fed to a first port of a network 40, and which is supplied to the electronic hybrid circuit via the transmit lead Tx. A loop current detector 30 is connected in series between a loop driver circuit 50 and the tip and ring terminals such that all of the current flowing along a telephone line via the tip and ring terminals 2 and 3 also traverses the loop current detector 30. The loop current detector 30 is responsive to differential current flowing via the tip and ring terminals for generating a line signal which is useful in an associated telephone facility for detecting ON HOOK and OFF HOOK conditions. The line signal is also supplied to a second port of the network 40. The composite signal and the line signal combine in the network 40 to provide a control signal at a third port of the network 40, which is connected to a loop driver circuit 50. The loop driver circuit 50 connects the tip and ring terminals 2 and 3 with the power terminals GRD and −V to provide a flow of energizing direct current for the operation of a telephone set while it is OFF HOOK. The loop driver circuit 50 also drives alternating current signals via the tip and ring terminals, such that the line interface circuit terminates the telephone line with a characteristic impedance which substantially corresponds to a predetermined preferred impedance. For example throughout North America, most operating telephone companies require a terminating impedance which is equivalent to 900 ohms in series with 2.16 microfarads.

Figure 2:
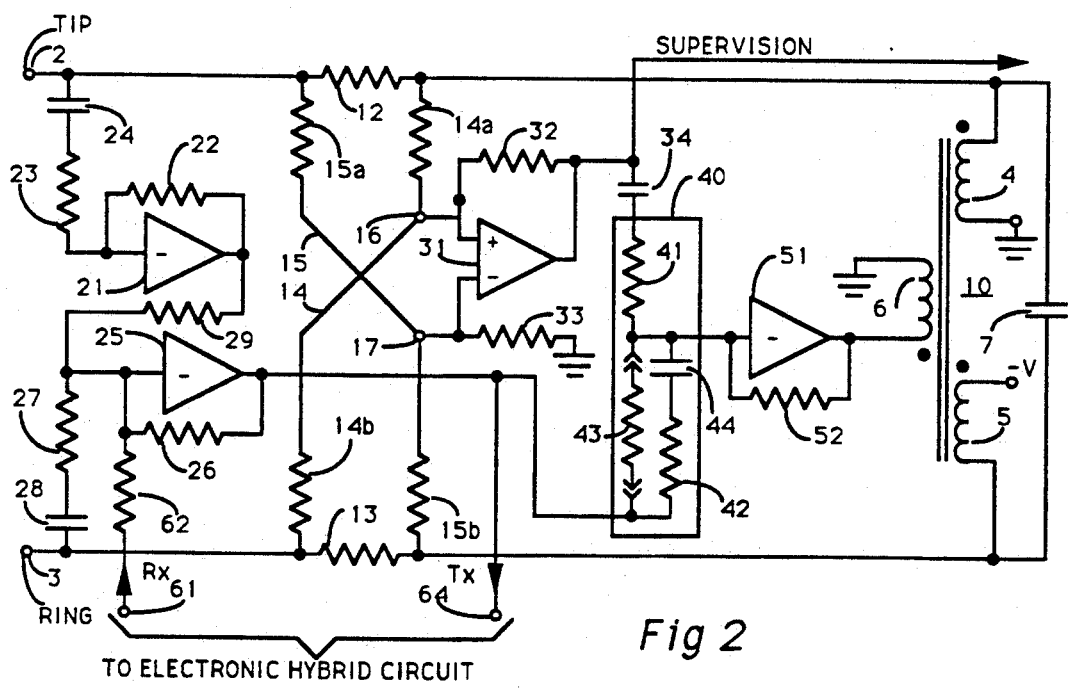
FIG. 2 is a schematic diagram of an example implementation of the line interface circuit illustrated in FIG. 1.

A detailed example of the line interface circuit of FIG. generally 1 is illustrated in FIG. 2. In the figures, details of distribution of power, arrangements of decoupling filters and biasing circuits are neither shown nor described except where such may be beneficial to a person of typical skill in the electronic arts in understanding the embodiments of the invention.

The tip and ring signal voltage detector 20 includes a tip amplifier circuit and a ring amplifier circuit. The tip amplifier circuit is provided by an amplifier 21 being connected with resistors 22 and 23, and a capacitor 24, as shown. The ring amplifier circuit is provided by an amplifier 25 being connected with resistors 26 and 27, and a capacitor 28, as shown. The capacitors 24 and 28 serve to isolate the respective amplifiers 21 and 25 from DC potentials at the tip and ring terminals 2 and 3. A resistor 29 is connected from the output of the amplifier 21 to the input of the amplifier 25 such that in combination only differential signals appearing across the tip and ring terminals are reproduced at the output of the amplifier 25. In this example the value of the resistor 22 is about a tenth of the values of the resistors 23 and 27 to substantially reduce any possibility of either of the amplifiers 21 and 25 being driven into regions of nonlinear operation by the presence of common mode signals, as may be induced upon a telephone line by the influence of a utility power line. Receive signals from the electronic hybrid circuit and destined for the telephone line are coupled via the receive terminal Rx, labelled 61, and a resistor 62 to the input of the differential amplifier 25. The output of the amplifier 25 is connected to the first port of the network 40, and to the transmit terminal Tx, labelled 64.

The loop current detector 30 includes a resistor network having a tip feed resistor 12, a ring feed resistor 13, each of which conducts virtually all of the currents traversing the tip and ring terminals 2 and 3 respectively. The feed resistors should be able to dissipate several watts and have values of about 200 ohms, and are usually matched to within one percent of each other. The resistor network also includes tip and ring voltage dividers 14 and 15 provided by resistors 14a, 14b, and resistors 15a and 15b connected as shown to define tip and ring taps 16 and 17. The values of the resistors 14a, 14b, 15a, and 15b are usually matched to be within plus and minus one percent of each other. The tip and ring taps 16 and 17 are connected across a differential input of a differential amplifier 31, which is connected as shown in combination with resistors 32 and 33. The values of the resistors 32 and 33 are also similarly matched to be within plus and minus one percent of each other. Currents related to currents in the tip and ring feed resistors 12 and 13 are conducted via the tip and ring taps 16 and 17 and the resistors 32 and 33 respectively. Hence the differential amplifier 31 is direct coupled to generate the previously mentioned line signal which is representative of differential currents traversing the tip and ring terminals 2 and 3. The line signal is applied to a supervision lead 66 for use in the telephone facility, and to a second port of the network 40 via a capacitor 34. The capacitor 34 serves to isolate the network 40 from a direct current potential at the output of the amplifier 31.

The network 40 includes a resistor 42 and a capacitor 44 connected in series between the first and third ports and a resistor 41 connected between the second and third ports. This is to provide the previously mentioned terminating impedance of 900 ohms in series with 2.16 microfarads. It has been found that in a lower portion of the voice band, the preferred terminating impedance is more closely adhered to if the RC values of the capacitor 24 and the resistor 23 and the capacitor 28 and the resistor 27 are about the same as the RC value of the capacitor 34 and the resistor 41. A resistor 43 is shown to be optional and is required in those cases where an operating telephone company's standard line terminating impedance includes a parallel resistance value.

In this example, the value of the resistor is selected to be 900 ohms multiplied by a value x and the value of the capacitor is selected to be 2.16 microfarads divided by the value x. The value of x may be determined as follows:

The $K_1$ represents a current-to-voltage transfer function of the loop current detector 30, such that $$V_1 = K_1 I_{(T-R)}$$

$K_2$ represents a voltage-to-voltage transfer function of tip and ring signal voltage detector 20, such that $$V_2 = K_2 V_{(T-R)}$$

then, $1/x = K_1/RK_2$ ie. $x = RK_2/K_2$ where $I_{(T-R)}$ is differential line current and
$V_{(T-R)}$ is differential line voltage
In the example shown,
R = 5 kilohms
$K_1$ = 25 mv/mA
$K_2$ = 1.00
x = 200

The loop driver circuit 50 includes an amplifier 51 with an input connected to the third port of the network 40 and an output connected to a primary winding 6 of a transformer 10. A feedback resistor 52 is connected between the input and the output and is of a value selected to cause the amplifier 51 to operate with a gain of about 100. The transformer 10 includes a tip winding 4 connected in series with the tip feed resistor and the ground power terminal GRD, and a ring winding 5 connected in series with the ring feed resistor and the power terminal −V. A capacitor 7 is connected across the tip and ring windings 4 and 5 to reduce electrical noises which may originate with battery charging apparatus. The windings are poled as indicated in FIG. 2 by conventional dot notation. In operation, energizing direct current is driven along a path which includes the power terminals and the tip and ring windings 4 and 5, which are poled in a flux reinforcing direction.

A suitable transformer may be constructed to have tip and ring windings of 376 turns each of number 40 American Wire Gage insulated copper wire and a primary winding of 376 turns of number 42 American Wire Gage insulated copper wire. The windings are carried upon a transformer core of ferrite material. One suitable core, with identification #EM6 has been found to be available from Thompson Passive Components, 50 Rue J. P. Timbaud/BT13/92403, Courbevoie, Cedx, France. Saturation by loop currents of up to 100 milliamps is avoided by limiting the number of turns in the tip and ring windings and by having a gap in the core of the transformer of about 0.38 millimeters. In one example of the line interface circuit component values as listed herein below have been found to be satisfactory.

| Component | Value | Units |
| --- | --- | --- |
| resistor | 12, 13 | 180 ohms |
|  | 14a, 14b, 15a, 15b | 120 kilohms |
|  | 22, 29 | 20 " |
|  | 23, 26, 27 | 200 " |
|  | 32, 33 | 7.5 " |
|  | 41 | 5 " |
|  | 43 | 180 " |
|  | 52 | 5 megohms |
|  | 62 | 100 kilohms |
| capacitor | 7, 24, 28 | 0.1 microfarads |
|  | 34 | 4 " |
|  | 44 | 10.6 nanofarads |

Figure 3:
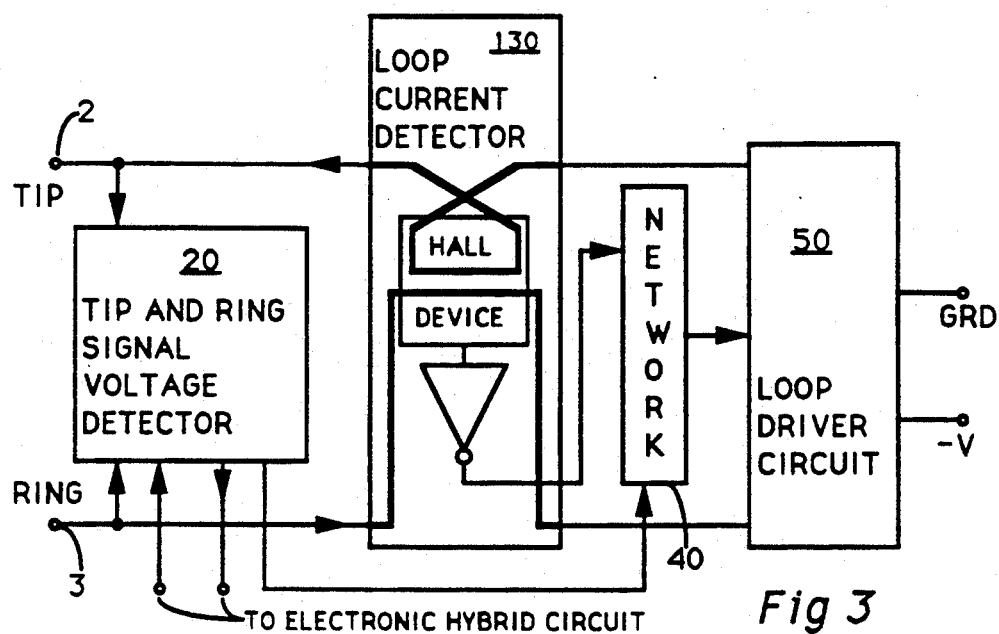
FIG. 3 is a schematic diagram of an alternate example of a loop current detector which may be used in the line interface circuit illustrated in FIG. 1.

Referring to FIG. 3, an alternate example of a loop current detector 130 is substituted for the loop current detector 30, in FIGS. 1 and 2. In other respects FIG. 3 is consistent with the preceding figures. In this example the loop current detector is provided by a hall effect device 135, which is arranged in combination with tip and ring conductors 112 and 113 to be sensitive to differential currents traversing the tip and ring terminals 1 and 2. This is accomplished by orienting the tip and ring conductors such that common mode currents are of a magnetic flux cancelling effect, as shown. In operation the hall effect device 135 generates an output voltage of a magnitude corresponding to the flux intensity and of a polarity corresponding to the direction of the flux. This arrangement eliminates the requirement of a common mode rejection characteristic in an on-following amplifier. The output voltage is conveniently amplified by an inverting amplifier circuit shown at 131.

Figure 4:
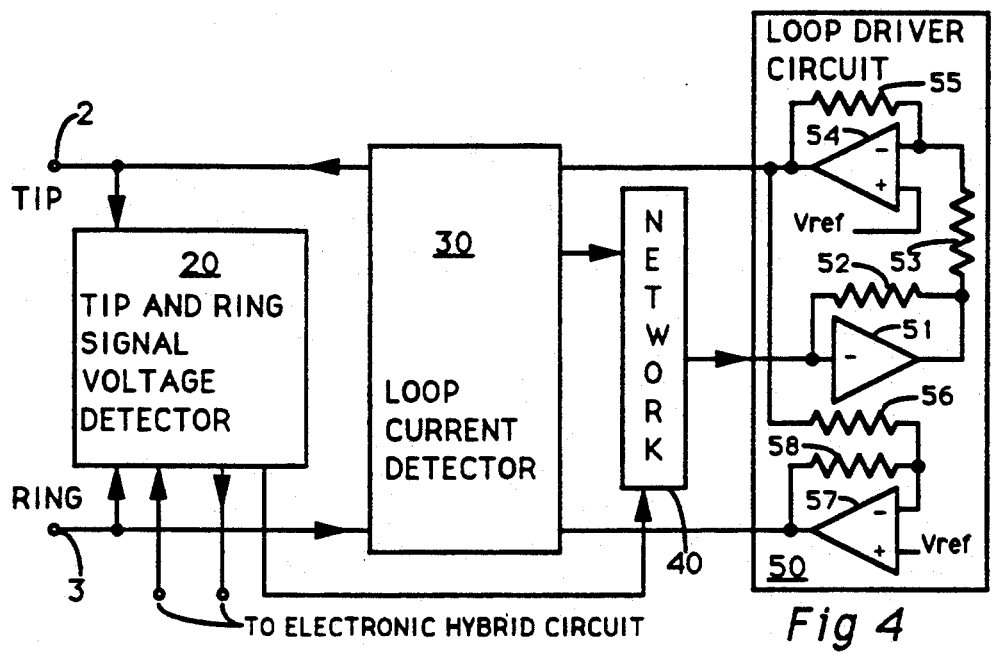
FIG. 4 is a schematic diagram of an alternate example of a loop driver circuit which may be used in the line interface circuit illustrated in FIG. 1.

Referring to FIG. 4, an alternate example of a loop driver circuit 150 is substituted for the loop driver circuit 50, in FIGS. 1 and 2. Otherwise, the figure is in accordance with the preceding figures. In this example the loop driver circuit 150 includes the amplifier 51 as in FIG. 2, but the functions of the transformer 10 are performed by tip and ring amplifiers 154 and 157. The tip amplifier 154 includes an input which is coupled to the output of the amplifier 51 via a resistor 153. The ring amplifier 157 includes an input which is coupled to an output of the amplifier 154 via a resistor 156. Circuit values, as previously suggested for implementing the line interface circuit illustrated in FIG. 2, may be satisfactory for implementing the line interface circuit illustrated in FIG. 4, providing that values of feed back resistors 155 and 158 are chosen to operate the tip and ring amplifiers each with unity gain. For operation the tip and ring amplifiers 154 and 157 are each connected to the central battery supply via power terminals (not shown). The outputs of the tip and ring amplifiers may be connected as shown to supply operating direct current and signals destined for the telephone line to the tip and ring terminals 2 and 3, via the loop current detector 30, or via the loop current detector 130. In view of the substitution of solid state amplifiers for the transformer 10, the line interface circuit of FIG. 4, may be more economical to manufacture. Furthermore active tip and ring feed devices such as the amplifiers 154 and 157 are readily adaptable to providing a feed current limiting function which is advantageous on short subscriber loops which would normally draw in excess of 50 milliamps or so, for example, from the central battery supply. However the line interface circuit may also be more vulnerable to transient events such as lightning strikes. Hence it may be advantageous to restrict the embodiment of FIG. 4 to uses with loops which are least likely to be subjected to such events.

Figure 5:
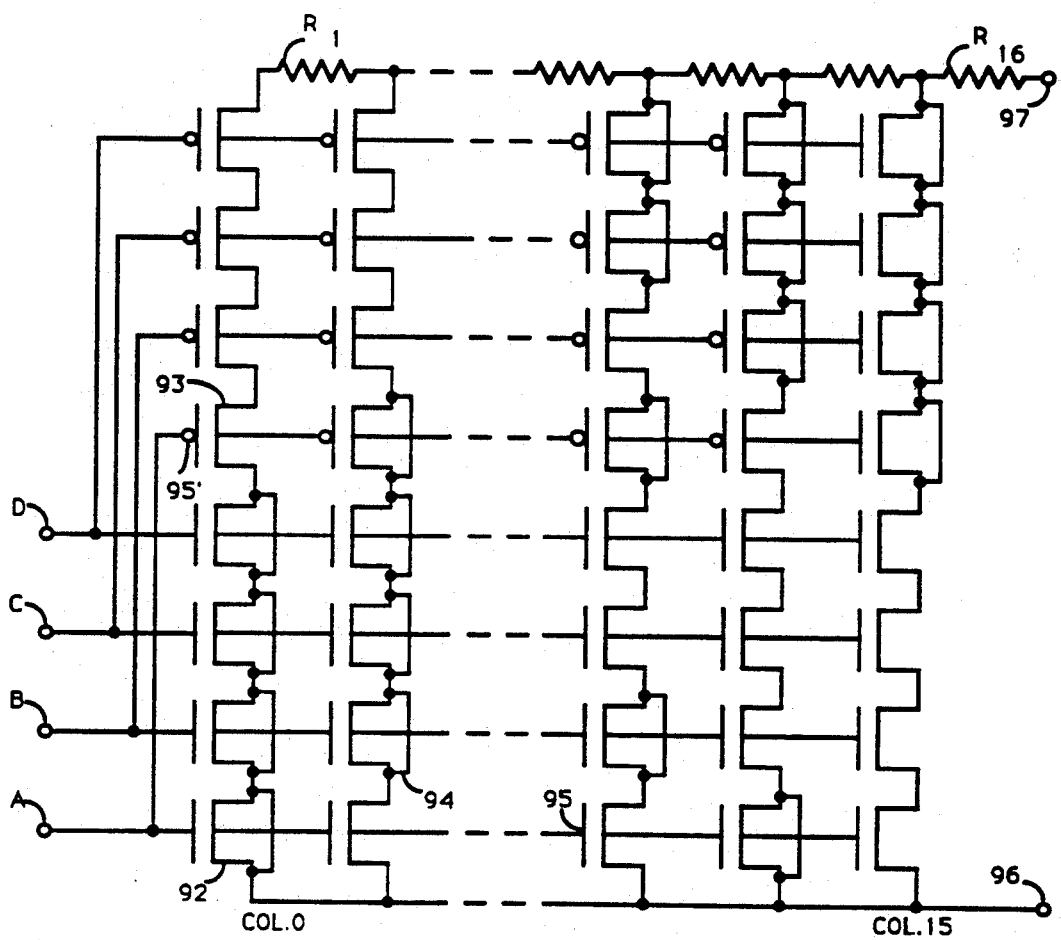
FIGS. 5 and 6 are schematic diagrams of examples of variable components which may be used in any of the line interface circuits illustrated in the preceding figures.
Figure 6:
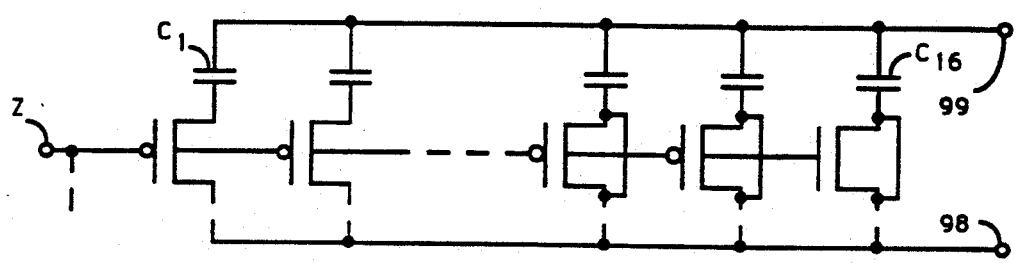

The network 40 may include one or more integrated circuit resistive and capacitive devices which are variable in response to digital control signals. Examples are shown in FIGS. 5 and 6. In FIG. 5 a resistive device includes resistors R1-R16 being connected in combination with switch columns COL.0-COL.15 each of which is uniquely responsive to a digital control signal applied at terminals A-D to provide a selected predetermined resistance value across terminals 96 and 97. Each of the columns is provided by a combination of field effect transistors (FETs), directly responsive types being identified at 92 with gate electrodes 95 and inversely responsive types being identified at 93 with gate electrodes 95. The uniqueness of response of each column is determined by arrangements of shorting conductors as illustrated at 94. In FIG. 6 a capacitive device includes capacitors C1-C16 arranged with columns of abbreviated illustration but similar to those shown in FIG. 5. The capacitive device is uniquely responsive to a digital control signal applied at terminals W-Z, of which only terminal Z is shown to provide a selected predetermined capacitance value across terminals 98 and 99. These are exemplary of conveniently controllable means by which the characteristic terminating impedance of the line interface circuit may be selected subsequent to manufacture to suit the requirements of a particular telephone company.

Figure 7:
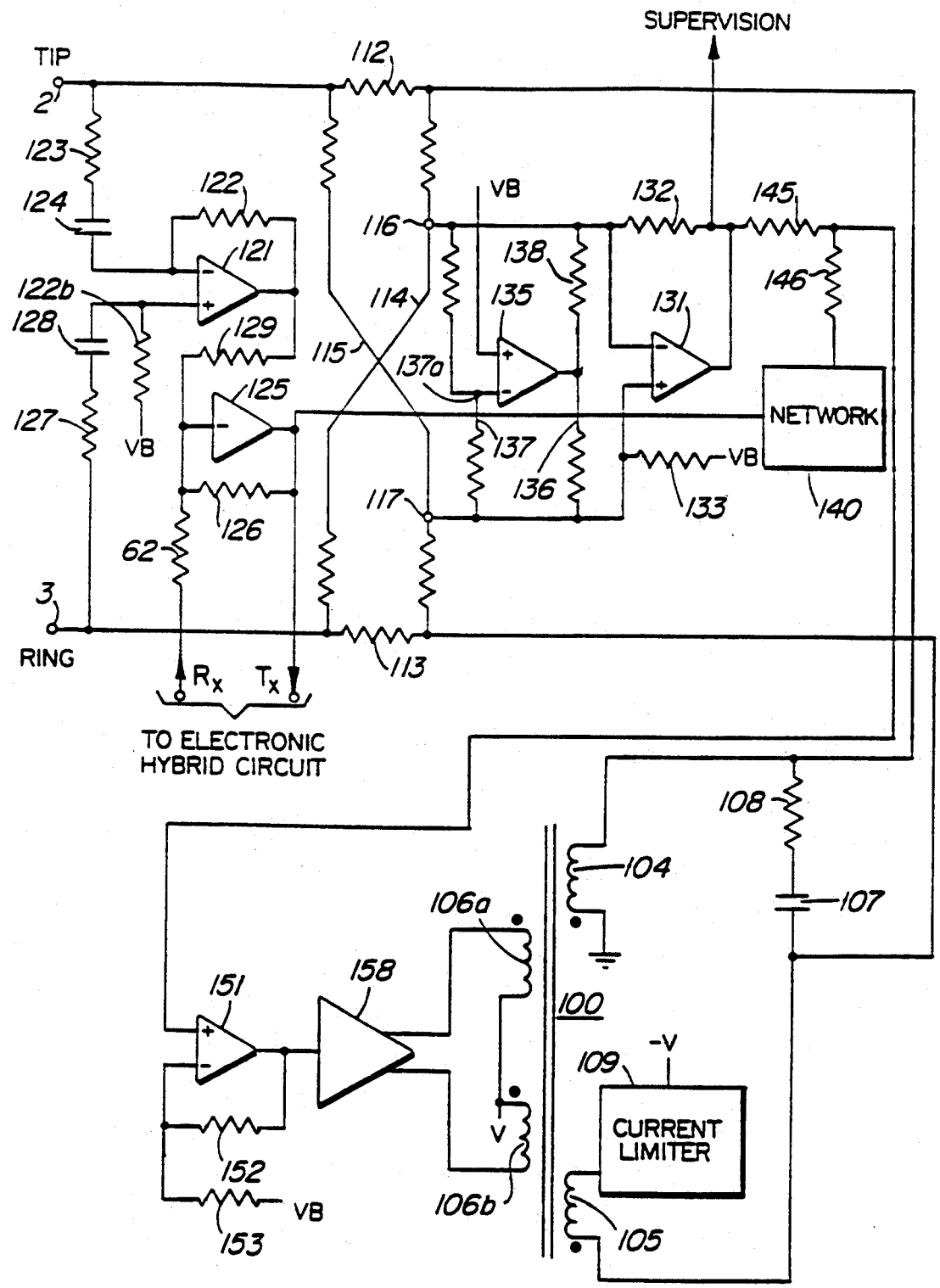
FIG. 7 is a schematic diagram of another alternate example of a loop current detector which may be used in the line interface circuit illustrated in FIG. 1.

Another alternate detailed example of the line interface circuit of FIG. 1 is illustrated in FIG. 7. In FIG. 7, the tip and ring signal voltage detector is provided by a differential amplifier 121, with inverting and non inverting inputs being connected to the ring and tip terminals 3 and 2 by series combinations of a resistor 127 and a capacitor 128, and a resistor 123 and a capacitor 124, respectively. A bias voltage VB is coupled to the non inverting input via a resistor 122b and a feedback resistor 122 is connected between an output of the differential amplifier 121 and the inverting input. Said output is also connected via a resistor 129 to an input of an inverting amplifier 125. An output of the inverting amplifier 125 is directly connected to a first port of a network 140 and a feedback resistor is connected between the input and the output of the inverting amplifier 125. Similar to the example discussed in relation to FIG. 2, an output of an electronic hybrid circuit, not shown, is connected to provide receive signals, destined for the telephone line to the input of the inverting amplifier 125 via the resistor 62. Hence a composite signal, including components of the differential signals on the telephone line and receive signals destined for the telephone line, is generated at the output of the inverting amplifier 125 and provided at the first port of the network 140 and at an input of the electronic hybrid circuit.

A loop current detector includes a resistor network having a tip feed resistor 112, a ring feed resistor 113, each of which conducts virtually all of the currents traversing the tip and ring terminals 2 and 3 respectively. In this example the feed resistors may be provided by resistive elements, preferably having values matched to within a half percent of each other. The resistor network also includes tip and ring voltage dividers 114 and 115 having resistive elements with values being matched to be within a half percent of each other. Tip and ring voltage taps 116 and 117 are connected across voltage dividers 137 and 136. An inverting amplifier 135 includes an inverting input being connected to a voltage tap 137a, a non inverting input being connected to the bias voltage VB, and an output being connected via resistors 136 and 138, as shown. A differential amplifier 131 is connected with resistors 132 and 133, as shown, with non inverting and inverting inputs connected to the tip and ring voltage taps 116 and 117. The ohmic values of the components shown in the voltage divider 137 are preferably matched to within a few percent such that in operation of the amplifier 135, most if not all of any common mode signals as may be induced in or otherwise coupled to a telephone line being connected at the tip and ring terminals, will be substantially nullified, with only differential signals being passed along from the tip and ring voltage taps 116 and 117.

A network 140 is preferred to have a pass band characteristic limited to the operating frequencies of interest. The network 140 may include active components and adjustable components as exemplified in the FIGS. 6 and 5 and thereby be programable to be tailored to any specific application. The network 140 includes resistors 146 and 145 which are shown externally in FIG. 7 for convenience of discussion. Similar to the network 40 discussed previously, the network 140 includes the first port connected to receive the composite signal, a second port connected to the output of the amplifier 132 to receive a supervision signal, and a third port for coupling a control signal from the network 140 to a buffered input of a loop driver circuit. In the loop driver circuit, the buffered input is provided by an amplifier 151, having a gain as determined by a resistor 152, and biased by VB via a resistor 153. A class AB current amplifier circuit 158 responds to alternating current signals at the output of the amplifier 151, to drive the transformer 100 with alternating current signals destined to be coupled to a telephone line via the tip and ring terminals 2 and 3. The class AB current amplifier circuit 158 includes a double rail output which is connected to drive respective halves 106a and 106b of a centre tapped primary winding in the transformer 100. Tip and ring windings 104 and 105 in the transformer 100 are connected in series with the tip and ring terminals 2 and 3 as shown. It should be noted that in contract to other examples of the line circuit, in this example a current limiter 109 is connected in series between the ring winding 105 and the talking battery terminal −V. The current limiter 109 is designed to be effective below the voice band to limit energising direct current supplied via the tip and ring terminals 2 and 3. The current limiter 109 is operative for example in the case of the telephone line being a short loop or in the event of a ground fault occurrence on the telephone line. A damping network including a capacitor 107 and a capacitor 108 connected across the tip and ring terminals, reduces any likelihood of unwanted oscillations which may occur outside of the operating band of interest. The particular embodiment of the invention as illustrated in FIG. 7 has for purposes of efficient production, been realised to be advantageous. For example use of the class AB push pull amplifier 158 provides a driver circuit which permits the transformer 100 to be of reduced bulk and expense, relative to the transformer required for preferred operation of the line interface circuit in FIG. 2. Furthermore the use of a separate current limiter which passes frequencies of the voice band and greater permits a further reduction of transformer bulk and also reduces the maximum power dissipation requirements of the tip and ring feed resistors. In the example of FIG. 7, a suitable transformer may be constructed upon a powdered iron core #E13-40 available from Micrometals Inc., 1190 N. Hawk Circle, Anaheim, Calif. 92807-1788. The core carries tip and ring windings of 600 turns each of number 38 American Wire Gauge insulated copper wire and a primary winding of 600 turns per half of number 40 American Wire Gauge insulated copper wire.

What is claimed is:

1. A line interface circuit for supplying energizing current from power terminals to a two wire communication line and for coupling communications signals between the communication line and a telephone facility via a hybrid circuit means, comprising:

tip and ring terminals for connection to the two wire communication line;

hybrid transmit and receive terminals for connection to the hybrid circuit means;

a tip and ring signal voltage detector, being responsive to differential signals appearing across the tip and ring terminals and being of at least a voice band frequency, and being responsive to signals appearing at the receive terminal, for generating a composite signal;

a loop driver circuit including a voltage amplifier having an input for receiving a control signal and an output, and a transformer having a tip winding being connected in series with the tip terminal and one of the power terminals, a ring winding connected in series between the ring terminal and another of the power terminals, the tip and ring windings providing paths for the energizing current to flow and being poled such that energizing current flow is of a flux aiding effect, and a primary winding being connected in series with the output of the voltage amplifier;

the loop driver circuit being responsive to the control signal for driving alternating current signals via the tip and ring terminals;

a loop current detector, being connected in series between the tip and ring terminals and the loop driver circuit, for generating a supervision signal in response to current flow in the communication line; and a network having a first port being connected to receive the composite signal from the tip and ring signal voltage detector, a second port being connected to receive the supervision signal from the loop current detector, and a third port being connected to the input of the voltage amplifier for providing the control signal.

2. A line interface circuit as defined in claim 1 further comprising a direct current limiting circuit being connected in series between one of said power terminals and a corresponding one of said tip and ring windings.

3. A line interface circuit for supplying energizing current from power terminals to a two wire communication line and for coupling communications signals between the communication line and a telephone facility via a hybrid circuit means, comprising:

tip and ring terminals for connection to the two wire communication line;

hybrid transmit and receive terminals for connection to the hybrid circuit means;

a tip and ring signal voltage detector, being responsive to differential signals appearing across the tip and ring terminals and being of at least a voice band frequency, and being responsive to signals appearing at the receive terminal, for generating a composite signal;

a transformer having a primary winding, a top winding being connected in series with the tip terminal and one of the power terminals, and a ring winding being connected in series between the ring terminal and another of the power terminals, the tip and ring windings providing paths for the energizing current to flow and being poled such that energizing current flow is of a flux aiding effect;

an alternating current push pull amplifier circuit having outputs connected across the primary winding for driving alternating currents therethrough in response to a control signal;

a loop current detector, being connected in series between the tip and ring terminals and the loop driver circuit, for generating a supervision signal in response to current flow in the communication line; and a network having a first port being connected to receive the composite signal from the tip and ring signal voltage detector, a second port being connected to receive the supervision signal from the loop current detector, and a third port being connected to the alternating current push pull amplifier circuit for providing the control signal.

4. A line interface circuit as defined in claim 3, wherein the primary winding is centre tapped at a point between one and another halves.

5. A line interface circuit as defined in claim 3, wherein the alternating current push pull amplifier circuit is a class AB amplifier.

6. A line interface circuit as defined in claim 3 further comprising a direct current limiting circuit being connected in series between one of said power terminals and a corresponding one of said tip and ring windings.

7. A line interface circuit as defined in any of claims 2 or 6 wherein the direct current limiting circuit is connected in series between the ring winding and a corresponding one of the power terminals, and is operative to limit direct current flow via said power terminals and said ring terminal to a predetermined limit, in an event that a telephone line connected at the tip and ring terminals is a short loop or in an event of a ground fault occurrence along the telephone line, as would otherwise permit the direct current flow to exceed said predetermined limit.

8. A line interface circuit as defined in any of claims 4 or 5 further comprising a direct current limiting circuit being connected in series between the ring winding and a corresponding one of the power terminals, and being operative to limit direct current flow via said power terminals and said ring terminal to a predetermined limit, in an event that a telephone line connected at the tip and ring terminals is a short loop or in an event of a ground fault occurrence along the telephone line, as would otherwise permit the direct current flow to exceed said predetermined limit.

9. A line interface circuit for supplying energizing current from power terminals to a two wire communication line and for coupling communications signals between the communication line and a telephone facility via a hybrid circuit means, comprising:

tip and ring terminals for connection to the two wire communication line;

hybrid transmit and receive terminals for connection to the hybrid circuit means;

a first amplifier having an output and differential inputs, a first input capacitor being connected in series with a first input resistor between the tip terminal and a one of the differential inputs, a second input capacitor being connected in series with a second input resistor between the ring terminal and an other of the differential inputs, a first feedback resistor being connected between an inverting one of said one and another differential inputs and the output of the first amplifier, a network having first and second ports, and third port for providing a control signal, a second amplifier having an output being connected to the first port of the network and to the hybrid transmit terminal, and an input being resistively coupled to the output of the first amplifier and resistively coupled to the hybrid receive terminal, a loop current detector, being connected in series between the tip and ring terminals and having an output connected to the second port of the network for providing a supervision signal, in response to current flow in the communication line, and a loop driver circuit being connected in series between the power terminals for supplying the energizing current, and being responsive to the control signal for driving alternating current signals via the tip and ring terminals.

* * * * *

UNITED STATES PATENT AND TRADEMARK OFFICE
CERTIFICATE OF CORRECTION

PATENT NO. : 5,333,192  
APPLICATION NO. : 07/711600  
DATED : July 26, 1994  
INVENTOR(S) : Donald S. McGinn Page 1 of 1

It is certified that error appears in the above-identified patent and that said Letters Patent is hereby corrected as shown below:

In col. 1, line 5, the number "533,473" should read --553,473--.

Signed and Sealed this

Seventeenth Day of April, 2007

JON W. DUDAS  
*Director of the United States Patent and Trademark Office*